US006302567B1

(12) United States Patent
Gamble, Sr.

(10) Patent No.: US 6,302,567 B1
(45) Date of Patent: Oct. 16, 2001

(54) ATTACHABLE VEHICLE WARNING LIGHT

(76) Inventor: Ronald P. Gamble, Sr., 23172 Swan Rd., Watertown, NY (US) 13601

( * ) Notice: Subject to any disclaimer, the term of this patent is extended or adjusted under 35 U.S.C. 154(b) by 0 days.

(21) Appl. No.: 09/428,564

(22) Filed: Oct. 28, 1999

(51) Int. Cl.⁷ .................................................. G08B 21/00
(52) U.S. Cl. ........................ 362/505; 362/485; 362/540; 362/191; 362/398; 362/486; 362/413; 362/430; 340/431; 340/468
(58) Field of Search .................................... 362/485, 540, 362/505, 191, 398, 486, 413, 430; 340/431, 468

(56) References Cited

U.S. PATENT DOCUMENTS

| D. 395,275 | 6/1998 | Brungardt et al. . | |
|---|---|---|---|
| 3,487,359 | 12/1969 | McClintock . | |
| 3,590,236 | 6/1971 | Ussery . | |
| 3,731,082 | * 5/1973 | Blaylock | 240/10.5 |
| 3,761,706 | 9/1973 | Frey . | |
| 3,887,093 | 6/1975 | Howell . | |
| 4,395,749 | 7/1983 | Poveromo . | |
| 4,488,209 | * 12/1984 | Gosswiler | 362/386 |
| 4,646,952 | 3/1987 | Timmers . | |
| 4,859,982 | 8/1989 | Seaburg . | |
| 4,931,768 | * 6/1990 | Jincks et al. | 340/473 |
| 5,157,591 | 10/1992 | Chudzik . | |
| 5,161,874 | * 11/1992 | Benes | 362/32 |
| 5,438,490 | 8/1995 | Woodbury . | |
| 5,524,398 | * 6/1996 | Miller et al. | 52/121 |
| 5,980,070 | * 11/1999 | Hulse et al. | 362/385 |
| 6,100,795 | * 8/2000 | Otterbacher et al. | 340/431 |
| 6,110,795 | * 8/2000 | Otterbacher et al. | 340/431 |

* cited by examiner

Primary Examiner—Stephen Husar
Assistant Examiner—Anabel Ton
(74) Attorney, Agent, or Firm—August E. Roehrig, Jr.; Hancock & Estabrook, LLP.

(57) ABSTRACT

A vehicle warning lamp is provided for removable attachment to a vehicle through use of a standard trailer hitch coupling. The warning lamp is mounted at the distal end of a vertical post which telescopes between an extended position wherein the lamp is elevated, to provide enhanced visibility in all directions, and a lowered or storage position. The lowered position enables the lamp to remain on the vehicle in the lowered position so that the vehicle can be moved into areas of restricted height, such as a parking garage, and under other obstructions which the lamp might otherwise come into contact with when extended to its uppermost position.

The base of the vertical post is equipped with a hook or retainer which is engageable by a chain, cable or other such force-exerting device so that an extricating force can be applied to the vehicle through the auxiliary lamp in the event it becomes necessary to assist the attached vehicle in being extricated from such things as mud, sand or snowbanks.

7 Claims, 3 Drawing Sheets

ATTACHABLE VEHICLE WARNING LIGHT

TECHNICAL FIELD

This invention relates in general to vehicle warning lamps and, more particularly, to a selectively attachable and vertically adjustable warning lamp for indicating the presence of a vehicle.

BACKGROUND ART

The use of auxiliary lighting devices positioned at the top of a vertical support for increased vehicle visibility is known, and such fixed length devices which extend above the vehicle are disclosed in S.E. McClintock, U.S. Pat. No. 3,487,359, "STOP AND TURN INDICATOR FOR AN AUTOMOBILE", and K. Brungardt et al, U.S. Pat. No. Des. 395,275, "HITCH MOUNTABLE BICYCLE CARRIER WITH TAIL LIGHTS", discloses an auxiliary lamp mounted on a bracket supported by a fixed length vertical support hitch.

Such prior art patents utilize a vertical post of a fixed length to elevate auxiliary lamps to a position for increased visibility of the lamp, and thereby, the vehicle. In the McClintock patent, a pair of tubular members are secured to the rear bumper of an automobile by means of a pair of bumper mounts. Lamps are mounted at the top of the tubular members, and are thereby held in a fixed position for enhanced vehicle visibility. In the Brungardt patent, a bicycle carrier is shown having a pair of tail lights mounted from a vertical post of a fixed length which is supported from a vehicle through a hitch.

While these prior art devices provide desired features, the present invention is directed to overcome one or more of the problems associated with the prior art.

DISCLOSURE OF THE INVENTION

In one aspect of the present invention, a vehicle warning lamp is provided for removable attachment to a vehicle through use of a standard trailer hitch coupling. The warning lamp is mounted at the distal end of a vertical post which telescopes between an extended position wherein the lamp is elevated, to provide enhanced visibility in all directions, and a lowered or storage position. The lowered position enables the lamp to remain on the vehicle in the lowered position so that the vehicle can be moved into areas of restricted height, such as a parking garage, and under other obstructions which the lamp might otherwise come into contact with when extended to its uppermost position.

The base of the vertical post is equipped with a hook or retainer which is engageable by a chain, cable or other such force-exerting device so that an extricating force can be applied to the vehicle through the auxiliary lamp in the event it becomes necessary to assist the attached vehicle in being extricated from such things as mud, sand or snowbanks.

For convenience of illustration, the invention is described in a preferred embodiment with reference to its use on a snow plow, although the scope of the invention is not to be so limited. During snow plowing operations, when surfaces are plowed to remove snow the plowed snow is piled, and such piles increase in height which often extend above the vertical height of the vehicle lamps which are carried within the structure of the vehicle body.

When snow plowing operations are done, for example, on a driveway leading to a street or roadway, the plow moves back and forth along the driveway. Because a plowing vehicle usually begins its first driveway plowing operation from the street or roadway, after the initial plowing pass the vehicle moves in reverse along the path which it has cleared to begin another plowing operation. During such reverse movement, the plowing vehicle may enter upon or cross the street or roadway. When the snow extends to a height above the vehicle head lamps and tail lamps, the movement of the plowing vehicle may not be visible to vehicles moving on the street or roadway creating a hazardous situation, particularly when the plowing vehicle is moving in reverse with the headlights pointing inwardly away from the roadway. Accordingly, positioning a flashing elevated warning light at the rear of the plowing vehicle will enhance the visibility of the vehicle and promote safer operation.

The present invention is removably attachable to a plowing vehicle by being connected with a standard trailer hitch to provide a warning lamp positioned above the vehicle which is visible in all directions. In this manner, as the plow moves back and forth along a driveway, and near the street or roadway, a flashing light above the vehicle will provide an enhanced warning and better visibility of the plow at work. The hook at the connecting portion of the warning lamp provides a readily accessible point by which an extricating force can be applied to the plow to assist in removing the plow from any drifts or other circumstances under which it may have become stuck.

BEST MODE FOR CARRYING OUT THE INVENTION

Figure 1:
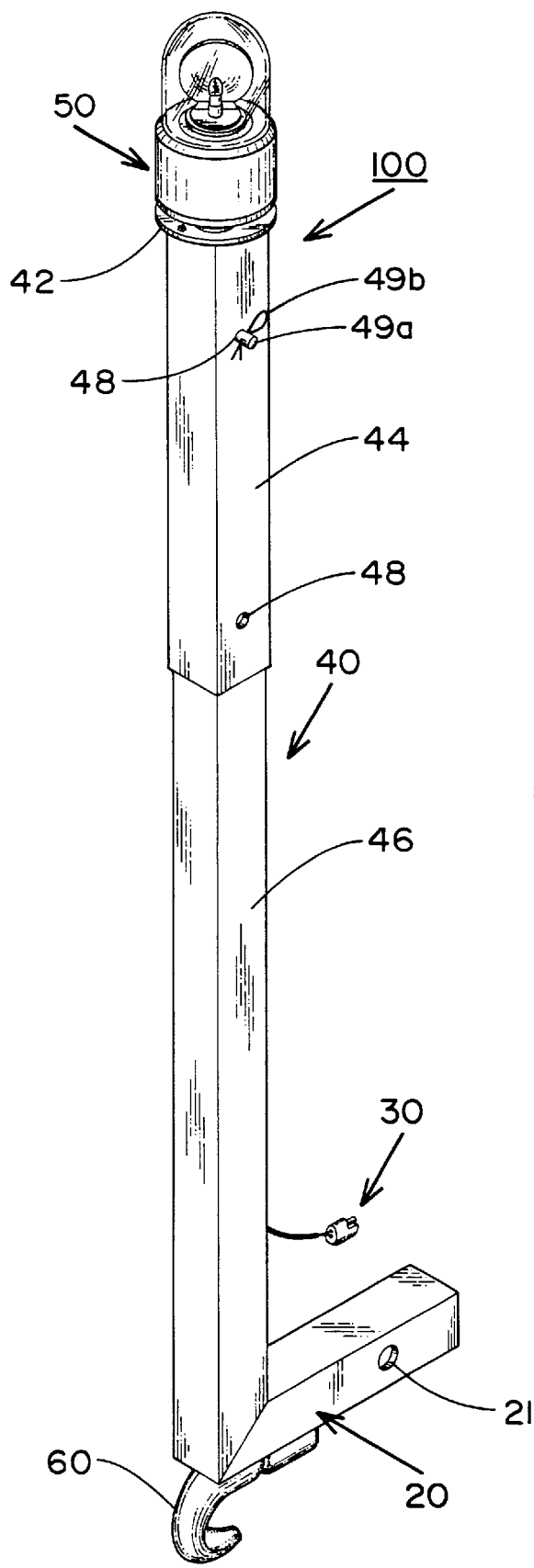
FIG. 1 is a perspective view of the invention with the warning lamp illustrated in a lowered position by telescoping an upper portion of the vertical post down over a lower portion.

Referring now to FIG. 1, there is illustrated a removably attachable vehicle warning lamp assembly 100 which may be connected to a standard trailer hitch receptacle (not shown) of the type utilized on automobiles, sport utility vehicles and light trucks. A horizontally extending hitch insert portion 20 is formed of a size and configuration for insertion into such a standard trailer hitch, and includes an aperture 21 formed therein through which a standard trailer hitch pin can be inserted to attach the warning lamp assembly 100 to the vehicle. A hook 60 is secured to the horizontally extending hitch insert portion 20, to assist in applying an extricating force if the vehicle to which the lamp assembly 100 is attached should become stuck. A standard electrical coupling 30 is connected to a warning lamp 50 so that the warning lamp 50 may be connected to the 12 volt power supply of the vehicle upon which the warning lamp is mounted. The warning lamp 50 is preferably a standard 360° amber warning lamp, available through automotive supply stores, for flashing an amber light of the type commonly used on service vehicles, such as tow trucks or other such commercial vehicles, to provide a 360° visibility warning.

Figure 2:
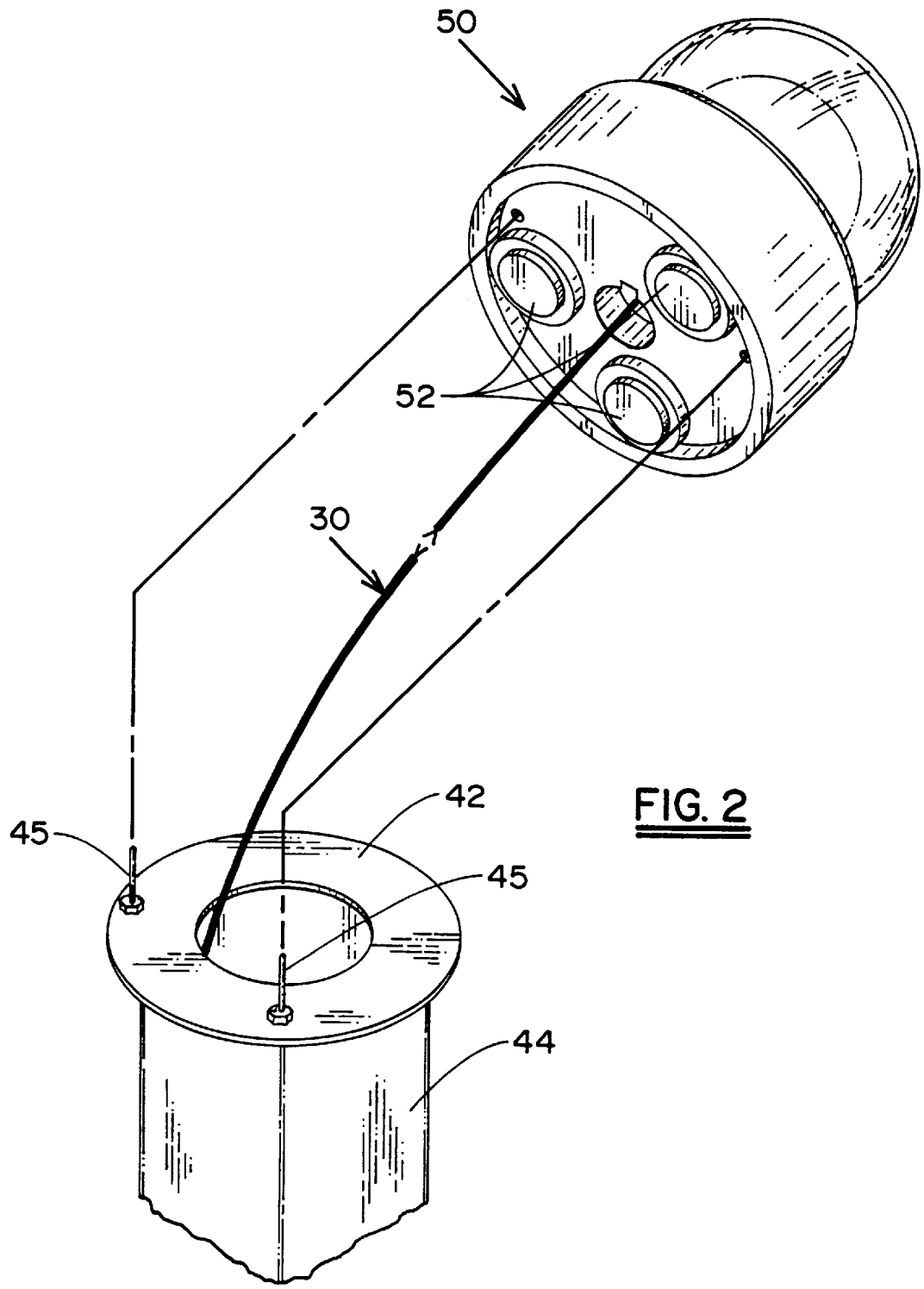
FIG. 2 is an enlarged view of the uppermost portion of the vertical post with the warning lamp removed therefrom to better illustrate the manner in which the warning lamp is attached and secured to the vertical post.

As best shown in FIG. 2, the lamp 50 includes a plurality of magnets 52 secured to the lamp base for securing the lamp to a steel surface. As shown in FIG. 2, the distal end of the upper portion 44 of a vertical post 40 has secured thereto a steel flange 42 to which the lamp 50 is magnetically attached. A pair of securing pins 45 are secured to the flange 42 and extend vertically upward therefrom to engage apertures 55 formed in the base of the lamp 50 for securing and maintaining the lamp 50 in a predetermined orientation relative to the vertical post 40.

Figure 3:
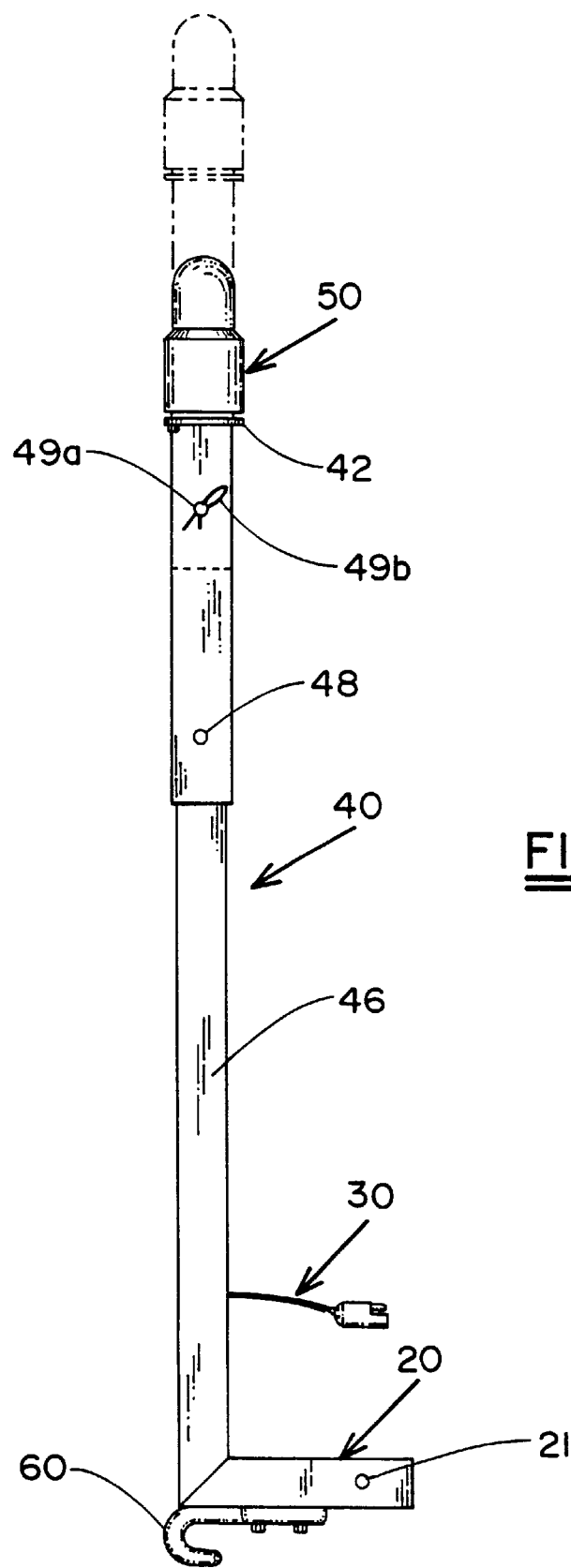
FIG. 3 is a side profile view of the invention with the auxiliary warning lamp illustrated by solid lines in the lowered position, as shown in FIG. 1, and with the extended position illustrated in phantom lines.

As best illustrated in FIGS. 1 and 3, the vertical post 40 is formed in two sections, the upper portion 44 which extends over and about a lower portion 46 so that the upper portion 44 may be telescoped to be raised and/or lowered relative to the lower portion 46 to vary the overall height, or vertical extension, of the vertical post 40. To this end, the upper portion 44 and the lower portion 46 each have a pair of apertures 48 formed therein spaced a predetermined distance apart. While two pairs of apertures 48 are illustrated in the preferred embodiment, it is to be understood that a greater or lesser number of apertures 48 could be used depending upon the degree of telescoping adjustability between the two sections 44 and 46 which is desired.

To secure the two sections 44 and 46 in the desired vertical position, a pin 49a and securing clip 49b are provided which are insertable through the apertures 48 for securing the two portions 44 and 46 in the desired relationship to fix the vertical height of the post 40. In this manner, when the lamp 50 is to be used for maximum visibility, see FIG. 3, the upper section 44 is elevated to its uppermost position and secured to the lower section 46 through the pin and aperture connection 48 and 49. Such increased vertical positioning will enhance the visibility of the lamp 50 when the vehicle is in operation.

Thereafter, when it is desired to move the vehicle into, for example, a garage, the upper section 44 can be lowered to its lowermost position relative to the lower section 46, for example, as shown in FIG. 1, beneath the roof line of the vehicle, so that there is no increase in height which might require a fixed post to be removed from the vehicle for parking the vehicle in a shelter such as a parking garage.

INDUSTRIAL APPLICABILITY

As was disclosed, one of the intended uses for this vehicle warning lamp assembly 100 is for attachment to vehicles used as snow plows, for example, pickup trucks, which employ a pusher blade on the front of the vehicle for removing snow from driveways. Such vehicles frequently are required to move in and out of driveway and an adjacent roadway. Positioning of the auxiliary lamp 50 at its uppermost position will extend the lamp 50 above the roof line of the plow and above the level of the snow which becomes piled adjacent to the drive and the roadway. In this manner the vehicle visibility is increased, especially when the vehicle is driven in reverse and is moving in a position transverse to the roadway during the plowing operations. Accordingly, vehicles traveling on the roadway will see the flashing yellow warning light as the snowplow operates, even when the adjacent drifts and plowing residue are of a height which would be above the vehicle headlamps, taillamps, and side marker lights.

In addition, the hook 60 carried by the horizontal hitch engaging portion 20, provides a ready means for extricating the vehicle. A chain, cable or such pulling device can be readily attached to the hook 20 and a force applied thereto which through the coupling to the vehicle hitch, will enable the vehicle to be pulled free from the snow or whatever material in which it has become stuck. In this manner the auxiliary vehicle lamp 100 functions not only as an effective warning lamp which enhances the vehicle visibility during operation, and which can be lowered to facilitate parking of the vehicle in covered shelters, but can also be utilized to extricate the vehicle in the event that it becomes stuck during work operation.

This invention has been described in the specification and illustrated in the drawings with reference to a preferred embodiment, the structure of which has been disclosed herein. However, it will also be understood by those skilled in the art to which this invention pertains that various changes or modifications may be made and equivalents may be substituted for elements of the invention without departing from the scope of the claims. Therefore, it is intended that the invention not be limited to the particular embodiment disclosed in the specification and shown in the drawings as the best mode presently known by the inventors for carrying out this invention, nor confined to the details set forth in the preferred embodiment, but that the invention shall include all embodiments, modifications and changes as may come within the scope of the following claims:

What is claimed is:

1. A vertically adjustable vehicle warning lamp assembly for removable attachment to a vehicle and including apparatus through which an extricating force may be applied to the vehicle to which the vertically adjustable vehicle warning lamp assembly is attached, comprising:

a vertically extending post for removable attachment to a vehicle, said vertically extending post having an upper portion and a lower portion;

said upper portion and said lower portion of said vertically extending post movable relative to each other to vary the vertical height of said vertically extending post;

a warning lamp carried at the distal end of said upper portion of said vertically extending post for emitting a warning signal of the presence of a vehicle to which said vertically extending post is attached;

said vertically extending post having a vehicle coupling portion spaced below said distal end and extending horizontal to said vertically extending post adapted to be received in and connected to a trailer hitch coupling;

said horizontally extending vehicle coupling portion including an aperture formed therein for receiving a connecting pin therethrough when said vehicle coupling portion is inserted into a trailer hitch coupling for connecting the vehicle warning lamp assembly to a vehicle; and a hook operatively connected to said vertically extending post through which an extricating force may be applied to the vehicle when said horizontally extending vehicle coupling portion is coupled to a vehicle.

2. The vehicle warning lamp assembly of claim 1 wherein said upper portion of said vertically extending post extends over at least part of said lower portion of said vertically extending post for telescoping movement of said upper and lower portions relative to each other for defining the vertical height of said vertically extending post.

3. The vehicle warning lamp assembly of claim 1 wherein said warning lamp is visible 360° about the distal end of said vertically extending post.

4. The vehicle warning lamp assembly of claim 1 wherein said warning lamp is magnetically connected to the distal end of said vertically extending post.

5. The vehicle warning lamp assembly of claim 1 wherein said distal end of said vertically extending post includes a plurality of securing pins, and said warning lamp includes a plurality of securing pins receiving apertures such that upon said securing pins engaging said securing pin apertures, said warning lamp will be secured in a desired position at the distal end of said vertically extending post.

6. The vehicle warning lamp assembly of claim 1 wherein said hook operatively connected to said vertically extending post is carried by said horizontally extending vehicle coupling portion.

7. The vehicle warning lamp assembly of claim 6 wherein said hook carried by said horizontally extending vehicle coupling portion is connected to a lowermost surface thereof.

* * * * *